United States Patent [19]
Graham

[11] Patent Number: 4,550,885
[45] Date of Patent: Nov. 5, 1985

[54] SELF-BRAKING RIBBON TRANSPORT APPARATUS

[75] Inventor: John F. Graham, Colinton, Scotland

[73] Assignee: Burroughs Corporation, Detroit, Mich.

[21] Appl. No.: 645,131

[22] Filed: Aug. 28, 1984

[30] Foreign Application Priority Data

Dec. 1, 1983 [GB] United Kingdom ................. 8332064
Dec. 1, 1983 [GB] United Kingdom ................. 8332062

[51] Int. Cl.⁴ ......................... G03B 1/04; G11B 15/32
[52] U.S. Cl. .................................. 242/204; 242/75.4; 400/234
[58] Field of Search ................. 242/75.4, 75.43, 75.47, 242/200–204, 189, 190; 360/74.2, 74.3; 400/234, 207, 208

[56] References Cited

U.S. PATENT DOCUMENTS

| | | | |
|---|---|---|---|
| 2,705,599 | 4/1955 | McCollough | 242/202 |
| 2,954,939 | 10/1960 | Herrmann | 242/203 |
| 3,032,286 | 5/1962 | Herrmann | 242/203 |
| 3,044,724 | 7/1962 | Goodwin | 242/55 |
| 3,090,573 | 5/1963 | Matovich, Jr. | 242/202 |
| 3,659,806 | 5/1972 | Crafts | 242/201 |
| 3,870,249 | 3/1975 | Schrader et al. | 242/75.4 X |

*Primary Examiner*—Leonard D. Christian
*Attorney, Agent, or Firm*—Mark T. Starr; Kevin R. Peterson

[57] ABSTRACT

In a tape transport mechanism, a payout reel is supported on a shaft whereabout is wound a helical spring inertia brake fixed at a first end and free at a second end, wound such that rotation of the payout reel in response the drawing therefrom of ribbon tends to cause the helical spring inertia brake to be wound more tightly onto the shaft. A portion of the ribbon passes onto a tension arm. A projection on the tension arm engages the second free end and unwinds the helical spring inertia brake to allow rotation of the shaft opposed by a predetermined amount of torque to maintain tension in the moving ribbon. When the moving ribbon ceases to be drawn from the payout reel, the tension arm moves back for the projection to allow the helical spring inertia brake once more to grip the shaft and bring the payout reel rapidly to a halt. An energy-storing two-diameter helical friction brake is further provided on the shaft to counter-rotate the shaft on cessation of movement of the ribbon to take up any inter-reel slack and to provide ribbon-movement-opposing torque to maintain tension in the ribbon when it is moving.

29 Claims, 7 Drawing Figures

SELF-BRAKING RIBBON TRANSPORT APPARATUS

BACKGROUND OF THE INVENTION

1. Field of the Invention

The present invention relates to an apparatus for transporting a ribbon from a payout reel to a takeup reel. It particularly relates to a ribbon transport apparatus wherein tension is maintained in all or some of the ribbon intermediate between the takeup spool and the payout spool. It yet further relates to ribbon transport mechanisms comprising only one motive actuator.

The invention is hereinafter described with reference to the transporting of an ink ribbon in a printing apparatus for the presentation of a fresh portion of ribbon to an impact printing apparatus after the printing of each character. The invention is not limited to such an application and may equally be applied to transport apparatus for magnetic tape in audio, digital and video applications and to transport apparatus for reeled paper. The invention may thus be applied to any apparatus wherein a ribbon of any kind of material is paid out from one reel and taken up onto another reel.

2. The Prior Art

In an ink ribbon transport system, an ink ribbon is drawn from a payout reel and taken up by a takeup reel. Between the payout reel and the takeup reel, there is provided a printing station whereat an impact printer using dot matrix or a solid typeface strikes the ribbon against a paper sheet to leave an imprinted visible character. The ink ribbon is moved on by one character space after the imprinting of each character for a fresh portion of the inked ribbon to be presented to the paper for the next character to be printed. The inked ribbon intermediate between the payout reel and the takeup reel is maintained in a state of tension so that it may be moved between the reels with a certainty of presenting fresh ribbon to the print head on each occasion.

Various systems exist for moving the ribbon between the reels. In a first system, the takeup reel is urged to take up the ribbon by a constantly-rotating friction clutch, whilst the payout reel is urged to oppose paying out by a constantly-rotating friction clutch driven by a motor in the opposite direction to the direction of motion of the payout reel when it is, in fact, paying out. Intermediate between the payout reel and the takeup reel there is provided a pinch wheel and capstan assembly for moving the ribbon. Such a system is to be found in most domestic cassette recorders where a single motor drives the pinch wheel and capstan assembly, the friction clutch on the takeup reel and the friction cluch on the payout reel. In more expensive magnetic cassette systems a separate motor can be provided for each of these functions. If tension is not maintained in the intermediate tape, then uncertainty of tape movement and starting and stopping can ensue. Such systems may be taken as typical prior art with regard to the present invention when it is used with magnetic tape.

For the transport of ink ribbons, it has been the practice to provide, on the paying out reel, a friction clutch which moves to oppose the paying out of the ink ribbon on each occasion of advancing of the ink ribbon. This system has the disadvantage of long-term instability on the opposing torque from the driven friction clutch and of a lack of tensioning drive to the clutch when the ink ribbon is not being moved. In an alternative improvement to such a system, a dedicated motor can be constantly run to drive the friction clutch on the payout reel. This system meets the objections to the earlier ink ribbon system in that the constantly-driven friction clutch on the payout reel takes up any slack tape intermediate between the two reels and maintains tension in the static tape. The improvement in function is achieved at the considerable expense of an additional motor over and above the required to advance the ink ribbon.

It is therefore desirable to provide a ribbon transport system utilizing only a single motor to advance the ribbon where tension is maintained in the ribbon between reels when the ribbon is moving, and where any slack ribbon between the reels is taken up when the ribbon is not being transported and where tension is maintained in the ribbon intermediate and stationary between the reels.

When the reels on a tape transport mechanism are large, the rotational inertia of each reel is correspondingly large. High reel inertia causes two problems. Firstly, when the ribbon or tape first begins to be drawn from the payout reel, tension in the ribbon or tape coming from the payout reel can momentarily reach very high levels as the payout reel is caused to accelerate to the necessary angular velocity. The high tension in the tape or ribbon so induced is undesirable on the ground that it may cause stretching and breakage of the tape or ribbon.

The second problem caused by high reel inertia happens when it is desired to stop the payout reel. A payout reel of high inertia will continue to run on and payout ribbon or tape as it decelerates to rest. The presence of excess slack ribbon or tape in the transport apparatus caused by this running on is undesirable.

It further becomes desirable to provide a tape transport apparatus where the payout reel may be steadily and progressively accelerated without shock tension in the ribbon or tape pulling on the payout reel, and wherein the payout reel may rapidly be brought to a halt when tape drawn therefrom ceases to pull on the payout reel.

SUMMARY OF THE INVENTION

According to a first aspect, the present invention consists in a ribbon transport apparatus for drawing off a ribbon from a payout reel, said apparatus comprising: a driving apparatus for drawing the ribbon from said payout reel; a shaft for supporting said payout reel, said shaft being freely rotatable in a first direction by the ribbon being drawn from said payout reel; a progressively releasable rotation-opposing brake on said shaft; and a tension sensing arm for engaging a portion of the ribbon intermediate between said driving apparatus and said payout reel and movable in response to increasing tension therein, coupled to progressively release said brake with said increasing tension in said portion, where, upon commencement of operation of said driving apparatus said arm progressively releases said brake until said brake allows the rotation of said shaft with a predetermined opposing torque for maintaining tension in said portion, and where, upon cessation of operation of said driving apparatus, said arm applies said brake to halt any overrun by said paying out reel.

According to a second aspect, the present invention consists in a ribbon transport apparatus for transporting a ribbon from a payout reel to a takeup reel, said apparatus comprising: a motor for rotating said takeup reel for drawing off the ribbon onto said takeup reel; a shaft for supporting said payout reel, said shaft being passively rotatable in a first direction by the movement of the ribbon from said payout reel onto said takeup reel; a friction brake on said shaft for opposing the rotation of said shaft with a predetermined amount of opposing torque; and an elastic energy store coupled to said friction brake for opposing the rotation of said friction brake with said shaft, where, the drawing of the ribbon onto said takeup reel is operative to cause said elastic energy store to store the energy imparted thereby to said shaft until said friction brake begins to slide on said shaft, where, thereafter said shaft is rotatable opposed by said predetermined opposing torque for maintaining tension in the ribbon intermediate between said payout reel and said takeup reel, and where, thereafter, upon cessation of said drawing of the ribbon onto said takeup reel, said elastic energy store is operable to deliver up a portion of said energy coupled to said friction brake to rotate said shaft in a second direction opposite to said first direction to take onto said payout reel any slack ribbon intermediate between said payout reel and said takeup reel and to maintain tension therein.

BRIEF DESCRIPTION OF THE PREFERRED EMBODIMENTS

In a preferred embodiment, a ribbon, preferably an ink ribbon in a removable cassette, is transported from a payout reel to a takeup reel. The takeup reel preferably provides the motive force for driving the ribbon between the reels. The takeup reel is preferably driven by a stepping motor which increments the position of the ribbon on each occasion of an impact printer producing a character. The transport apparatus preferably comprises a payout spindle for rotating the payout reel, and a takeup spindle for rotating the takeup reel. The payout spindle and the takeup spindle are preferably mounted on a common base whereon the reels are supported.

The payout spindle is supported on an idler shaft. The idler shaft is rotated by the ribbon being drawn from the payout reel. The idler shaft is corotational with the payout reel.

The shaft comprises an energy store and a friction brake. The friction brake comprises a helical spring brake coaxial on the shaft, having a relaxed diameter less than that of the shaft, and wound such that, as the shaft is rotated by the drawing off from the payout reel of the ribbon in a first direction, the shaft tends to unwind the helix. The friction brake thereby grips the shaft and is operative to apply a predetermined amount of friction-opposing torque to the shaft for maintaining tension in that portion of the ribbon intermediate between the payout reel and the takeup reel.

The energy store consists in a helical energy storage spring coaxial on the shaft having a relaxed diameter greater than that of the shaft and wound such that, as the shaft rotates in the first direction, the helix of the helical spring energy store tends to be unwound.

A first end of the helical spring energy store is affixed to the base. The second end of the helical spring energy store is affixed to a first end of the helical spring brake. The second end of the helical spring brake is free. The helical spring energy store and the helical spring brake are wound from a common piece of wire.

As the takeup reel commences winding ribbon from the payout reel, the helical spring friction brake on the shaft tends to unwind the helical energy storage spring until sufficient rotation opposing torque is applied by the helical energy storage spring to cause the helical spring brake to slide on the shaft and provide the predetermined amount of rotation-opposing torque to maintain tension in the moving ribbon between the payout reel and the takeup reel. When the takeup reel ceases to draw the ribbon onto itself, the helical spring energy store gives up a portion of its energy stored during the commmencement of movement of the ribbon to contrarotate the shaft in a second direction opposite to the first direction by acting through the helical spring brake to take up any slack ribbon intermediate between the stationary reels and to maintain tension in the intermediate ribbon.

The second end of the helical spring brake extends away from the helical spring brake and has an optical flag attached to the distal end thereof. When the ribbon is moving, the extension moves with the helical spring brake to point in a first direction. When the ribbon ceases to move, the extension once more moves a small distance back again with the helical spring brake as the energy storage spring takes up any slack ribbon intermediate between the reels. When there is no longer any ribbon remaining upon the payout reel, such as at the end of an ink ribbon cassette, the energy storage spring pays out all of its energy in contrarotating the shaft, and the extension moves to a predetermined position where the optical flag cuts a light beam in an optical sensor to indicate to the printer-operating system an end of tape condition.

The shaft is also provided with a helical spring inertia brake wound thereon, fixed at one end and tightened by the unwinding of the ribbon the better to grip the shaft. A tension arm on a return spring is rotated about a pivot in response to increasing tension in inter-reel ribbon to engage the free end of the helical spring inertia brake to release the inertia brake by partial unwinding thereof to allow rotation of the shaft with further rotation opposing torque inducing further tension in the inter-reel ribbon. When ribbon movement comes to an end or the ribbon breaks the tension arm re-applies the inertia brake which in turn rapidly brakes the ribbon payout reel to a halt.

BRIEF DESCRIPTION OF THE DRAWINGS

The invention is further explained, by way of an example, by the following description taken in conjunction with the appended drawing, in which:

FIG. 7 further shows an exemplary pinch wheel assembly for moving the ribbon.

DETAILED DESCRIPTION OF THE PREFERRED EMBODIMENTS

Figure 1:
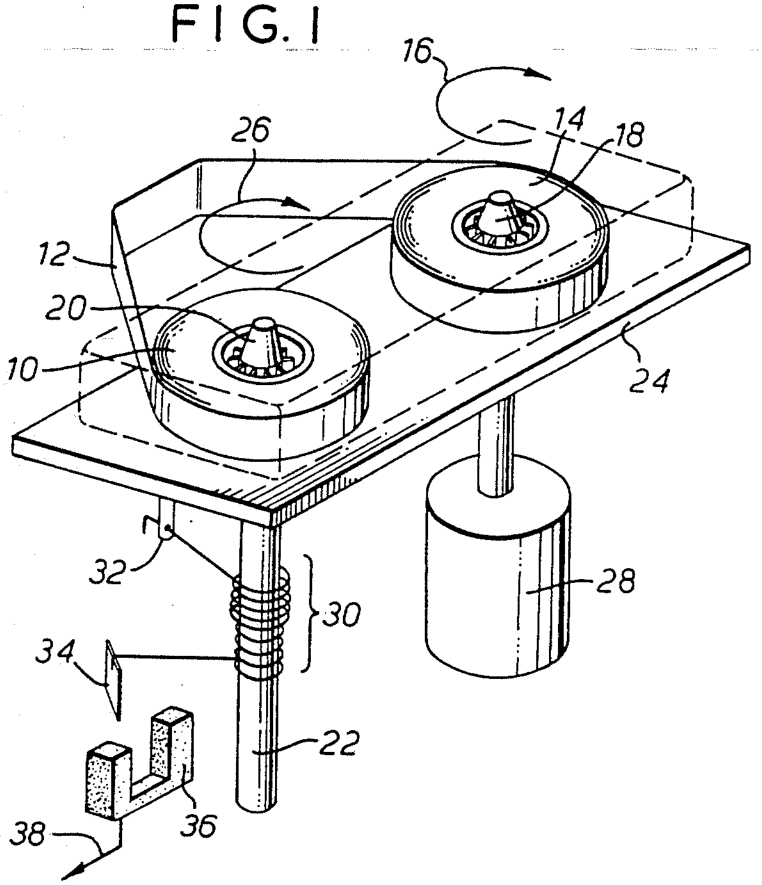
FIG. 1 shows a projected view of the preferred embodiment of the present invention having an ink ribbon cartridge mounted thereon.

FIG. 1 shows the preferred embodiment of the present invention with an ink ribbon cassette mounted thereon. A payout reel 10 pays out an ink ribbon 12 which is taken up by a takeup reel 14. The takeup reel 14 is rotated as indicated by a first arrow 16 by a takeup spindle 18. The payout reel 10 is moved solely by the action of the ink ribbon 12 being drawn off from the payout reel 10. The payout reel 10 in turn rotates a payout spindle 20 whereon the payout reel 10 is mounted. The payout spindle 20 rotates an idler shaft 22 beneath a base plate 24 whereon a cassette, (shown in phantom outline) containing the payout reel 10 and the takeup reel 14, rests. The cassette can be removed from the spindles 18, 20.

The idler shaft 22, the payout spindle 20 and the payout reel 10, when the ink ribbon 12 is moving from the payout reel 10 to the takeup reel 14, all rotate as indicated by a second arrow 26. The ink ribbon 12 moves past an impact printing station (which is not shown in any of the Figures) for an impact printing device of any kind known in the art to produce an image upon paper, also not shown in any of the drawings. The exact nature of the impact printing device is not an essential part of the present invention.

The takeup spindle 18 and the takeup reel 14 are together rotated by means of a takeup motor 28. In the present preferred embodiment, the takeup motor is a stepping motor which is incremented by one step for each instance of the impact printing apparatus printing using the ink ribbon 12. The takeup motor 28 need not necessarily be a stepping motor, and need not itself regulate the movement of the ink ribbon 12. As an acceptable variation on the preferred embodiment, the motor 28 may be used simply to draw the ribbon 12 onto the takeup reel 14 and the movement of the ink ribbon 12 can be regulated by means of a pinch wheel and capstan assembly intermediate between the reels 10,14.

Whilst the cassette shown in FIG. 1 is an ink ribbon cassette, it is to be appreciated that, where the invention is to be applied to the transport of data-bearing tapes, the cassette can be a magnetic tape cassette, and, where the present invention is to be applied to the transport of paper, the cassette can be a cassette for containing paper reels. Yet further, the reels 10,14 need not be contained within a cassette, and can be separately loaded.

A helical spring assembly 30 is provided coaxially on the idler shaft 22. The spring assembly 30 is anchored at one end on a peg 32, and the other end has an optical flag 34 affixed thereto for operating an end of ribbon optical sensor 36 which provides an end of ribbon signal on an output line 38.

Figure 2:
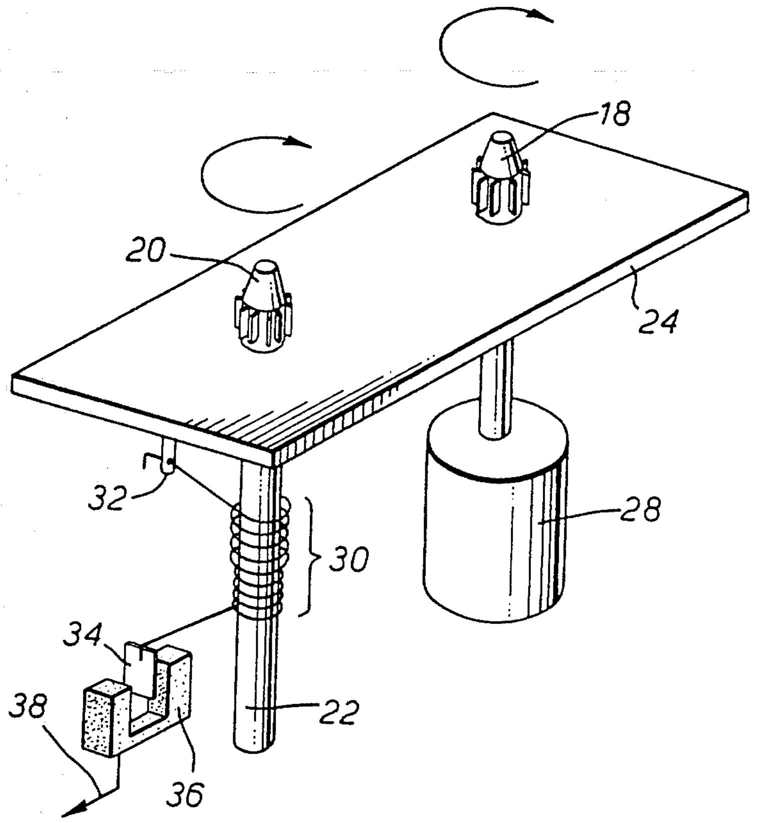
FIG. 2 shows the preferred embodiment of FIG. 1 without the ink ribbon cartridge mounted thereon.

FIG. 2 shows the preferred embodiment of FIG. 1 with the cassette and the reels 10,14 removed. The takeup spindle 18 and the payout spindle 20 are the only projections above the base plate 24. The optical flag 34 is shown in the position which it would occupy in the event of there being no cassette present on the spindles 18,20 and the base plate 24. The manner of the flag 34 arriving in this position is explained hereafter. The position of the flag 34 shown in FIG. 2 where the flag breaks a light beam in the optical sensor 36 to provide indication to the user system that there is no ink ribbon 12 engaging the payout spindle 20 is also consistent with all of the ink ribbon 12 having been transferred from the payout reel 10 to the takeup reel 14 shown in FIG. 1.

Figure 3:
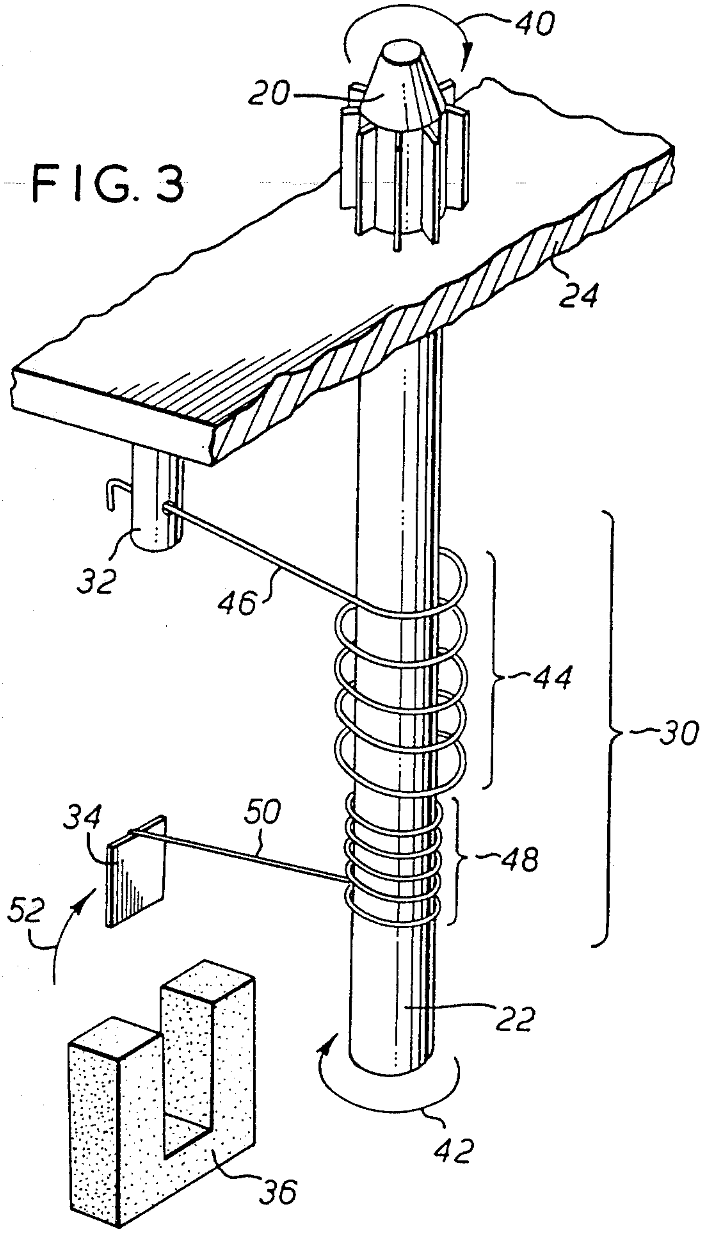
FIG. 3 shows a detailed view of the payout hub assembly of FIGS. 1 and 2 in the condition found when a ribbon is moving from the payout reel.

FIG. 3 shows detail of the idler shaft 22 and the payout spindle 20 in the condition which ensues when a ribbon 12 is being taken up by the takeup reel 14. When the payout reel 10 is giving up ink ribbon 12, the payout spindle 20 and the idler shaft 22 rotate as indicated by third and fourth arrows 40,42.

The spring assembly 30 comprises a helical energy storage spring 44. A first end of the helical energy storage spring 44 is held in the peg 32. The helical energy storage spring 44 has a relaxed diameter which is greater than the diameter of the idler shaft 22, and thus the helical energy storage spring 44 does not grip the idler shaft 22.

The spring assembly 30 further comprises a helical spring brake 48. The helical spring brake 48 has a relaxed diameter which is less than the diameter of the idler shaft 22 and thus the helical spring brake 48 grips the idler shaft 22.

The second end of the helical energy storage spring 44 is continuous with the first end of the helical spring brake 48. The second end of the helical spring brake 48 comprises an extension 50 at the distal end of which is supported the flag 34.

The helical energy storage spring 44 and the helical spring brake 48 are wound from a common piece of spring wire and thereby form the common spring assembly 30. The spring assembly 30 is affixed to the shaft 22 by the partial unwinding of the helical spring brake 48 for its diameter to be greater than that of the shaft 22. The spring assembly 30 is then slipped over the shaft 22, and the first end 46 of the helical energy storage spring 44 is slipped through a hole in the peg 32 to anchor it to the base plate 24.

The sense of winding of both the helical energy storage spring 44 and of the helical spring brake 48 is such that, when the shaft 22 rotates as indicated by the third and fourth arrows 40,42 when the ribbon 12 is moving, the gripping of the helical spring brake 48 on the shaft 22 tends to open both helices, that is, to unwind the two springs 44, 48.

As the ink ribbon 12 commences to move onto the takeup reel 14, so the helical energy storage spring 44 begins to be unwound. The helical energy storage spring 44 applies a rotational torque to the helical spring brake 48, and the rotational torque increases linearly with the angle of rotation of the payout spindle 20. The torque from the helical energy storage spring 44 tends to loosen the grip of the helical spring brake 48 on the shaft 22. When the force applied to the helical spring brake 48 from the helical energy storage spring 44 is sufficient to allow the helical spring brake 48 to slide on the shaft 22, the shaft 22 commmences to rotate inside the helical spring brake 48. The helical spring brake 48 opposes the rotation of the shaft 22 and of the payout spindle 20, and thus maintains tension in that portion of the ribbon between the payout reel 10 and the takeup reel 14. The relaxed diameter and elastic constant of the helical spring brake 48 are chosen, together with the coefficient of friction against the shaft 22, such that a predetermined rotation-opposing torque is applied to the shaft 22 to maintain tension in the intermediate ribbon 12 between the reels 10,14.

In storing sufficient energy to cause the helical spring brake 48 to slide on the shaft 22, the helical energy storage spring 44 allows the helical spring brake 48 to rotate as indicated by a fifth arrow 52 to a first extreme position indicative of the ribbon 12 being in motion. The flag 34 on the extension 50 is thus as far around in a first rotational direction (as directed by the third and fourth arrows 40,42) as it will go. The flag 34 is well clear of the optical sensor 36.

Figure 4:
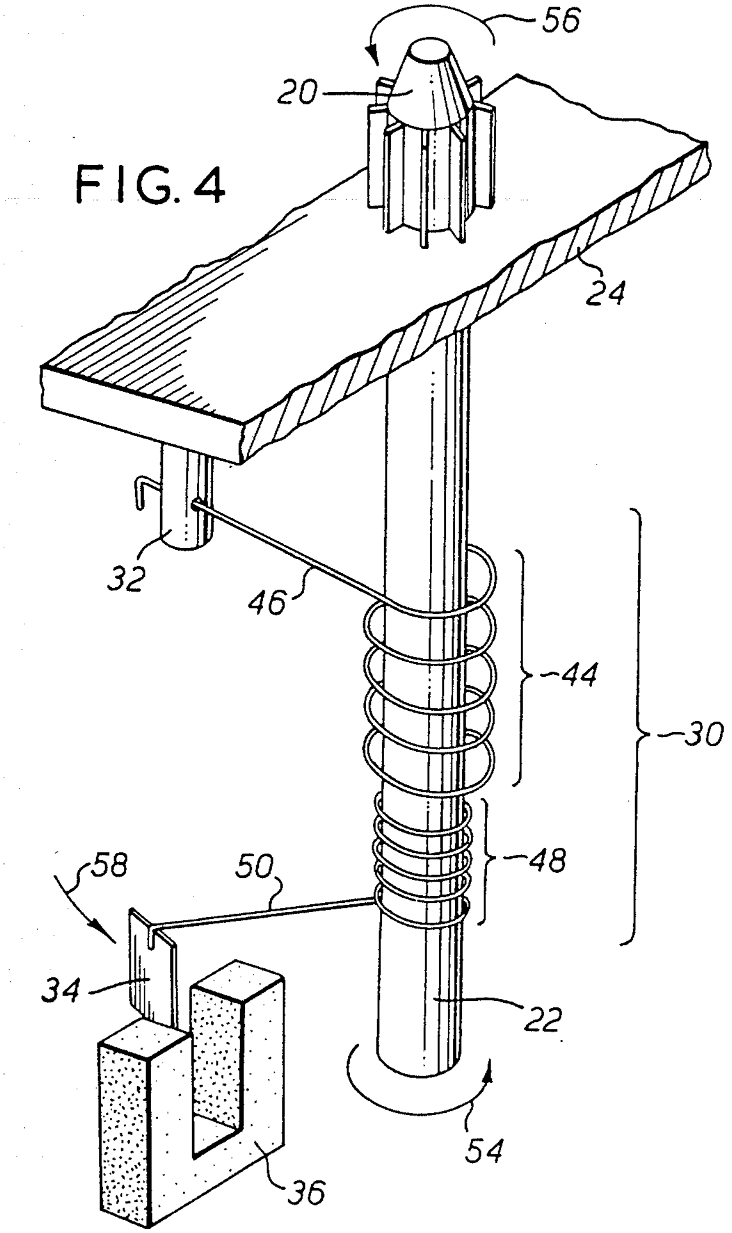
FIG. 4 shows the detail of FIG. 3 in a condition where the ribbon has ceased to move between the payout reel and the takeup reel of FIG. 1 and where any slack intermediate tape has been taken up onto the payout reel.

FIG. 4 shows the situation where the apparatus of FIG. 3 has passed from a state where the ribbon 12 is moving, to a state where the takeup reel 14 is no longer taking up any ribbon 12, but where there still remains ribbon 12 on the payout reel 10. When the force tending to rotate the shaft 22 as shown in FIG. 3 ceases to be applied, the helical spring brake 48 grips the shaft 22 with its predetermined amount of torque, and the helical energy storage spring 44 contrarotates the shaft 22 and spindle 20 as indicated respectively by sixth and seventh arrows 54,56 to take up any slack ribbon intermediate between the reels 10,14. In so doing, the helical energy storage spring 44 pays out a portion of its energy to rotate the shaft 22. The helical spring brake 48 rotates with the shaft 22 as indicated by an eighth arrow 58 for the extension 50 to carry the flag 34 part way towards the optical sensor 36. So long as some ribbon 12 remains on the payout reel 10, the shaft 22 cannot rotate sufficiently far for the flag 34 to enter the optical sensor 36 since there is no possibility of sufficient slack ribbon 12 being wound out between the reels 10,14. The flag 34 and the extension 50 therefore come to rest in an intermediate position.

Figure 5:
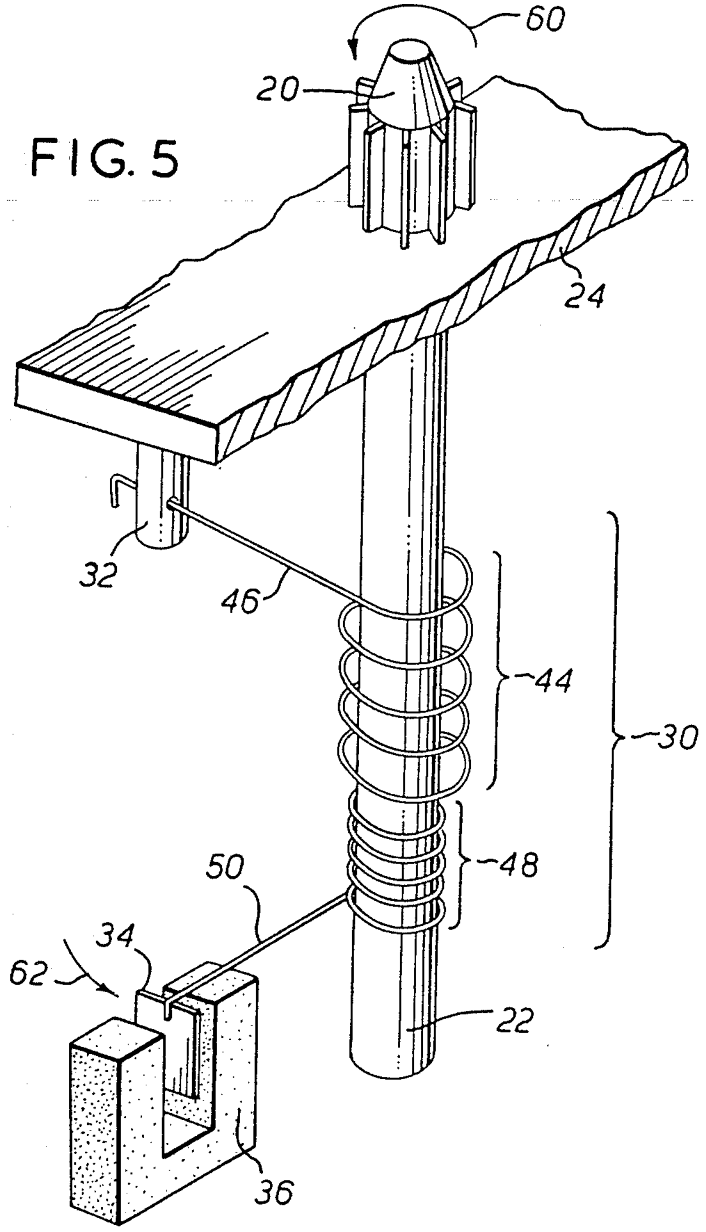
FIG. 5 shows the detail of FIGS. 3 and 4 where no further ribbon remains on the payout reel.

FIG. 5 shows the apparatus of FIGS. 3 and 4 where there is no longer any ribbon 12 engaging the payout spindle 20. This condition ensues whenever the cassette is removed or whenever the ink ribbon 12 supplied on the payout spindle 20 is depleted. The condition also ensues whenever there is a break in the increment which no longer allows tension in that portion of the ribbon 12 between the reels 10,14. The helical energy storage spring 44 pays out all of its previously-stored energy to rotate the shaft 22 and the payout spindle 20 as indicated by the ninth arrow 60. The helical spring brake 48 is gripped on the shaft 22 during the whole of the rotation, and the extension 50 carries the flag 34 as indicated by a tenth arrow 62 into the optical sensor 36 where it breaks a light beam. Indication is thereby provided to the outside world that no usable ribbon 12 is present in engagement with the payout spindle 20.

Figure 6:
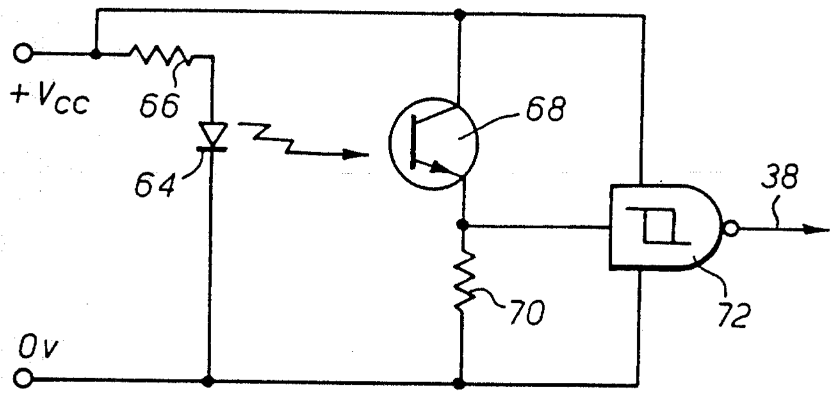
FIG. 6 shows an exemplary apparatus for implementing the optical sensor shown in FIGS. 1 to 5.

FIG. 6 shows just one example of a method of implementing the optical sensor 36. A light-emitting diode 64 is driven through a first resistor 66 from a supply rail +vcc. The diode 64 emits a light beam which is interrupted by the flag 34. Unless interrupted, the light beam falls upon a phototransistor 68 which cooperates with a second resistor 70, and an inverting Schmitt trigger gate 72 to provide a logically-true signal on the sensor output line 38 whenever the flag 34 is interposed between the light-emitting diode 64 and the phototransistor 68.

Figure 7:
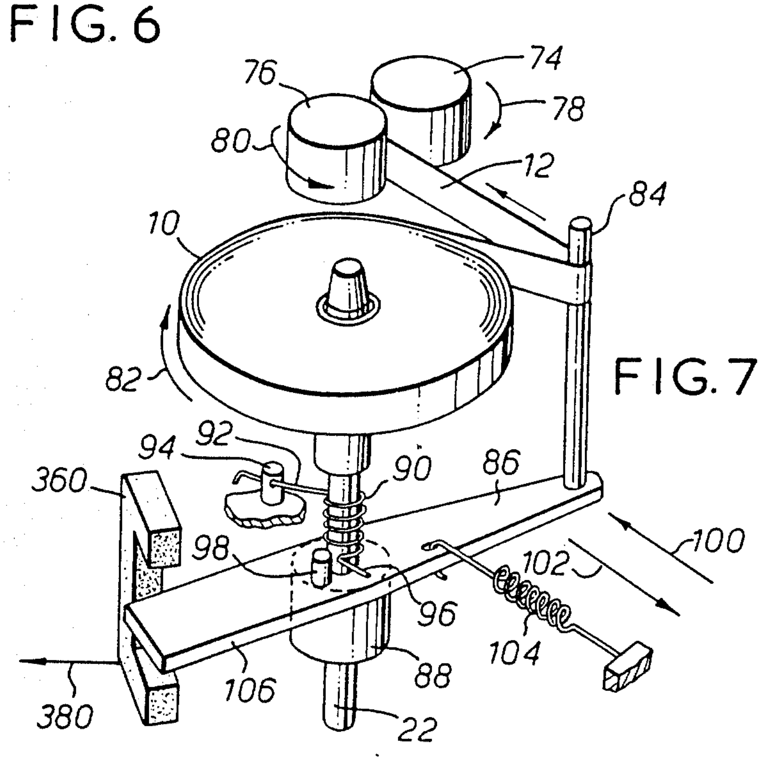
FIG. 7 shows the addition of the inertial braking apparatus applied to the shaft of FIGS. 1 to 5 in addition to those features shown in FIGS. 1 to 5.

FIG. 7 shows additional inertial braking components which are applied to the shaft 22 of FIGS. 1 to 5 for the acceleration of the payout reel 10 without the induction of unduly high tension in the ribbon 12 between the payout reel 10 and the takeup reel 18. The additional components shown in FIG. 7 further allow for the rapid deceleration of the payout reel 10 whenever tension in the ribbon 12 between the payout reel 10 and the takeup reel 14 is relaxed.

First and second drive rollers 74,76, shown only by way of example to illustrate a second manner in which the ribbon 12 can be drawn from the payout reel 10, rotate as indicated respectively by eleventh and twelfth arrows 78,80 to pull the ribbon 12 from the payout reel 10, the payout reel 10 rotating as indicated by a thirteenth arrow 82. The first and second drive rollers 74,76 can be situated at any point between the payout reel 10 and the takeup reel 14 in which case the motor 28 merely serves to ensure the taking up of the ribbon 12 onto the takeup reel 14. The actual speed of progress of the ribbon 12 between the payout reel 10 and the takeup reel 14 being controlled by the first and second drive rollers 74,76.

The ribbon 12 between the drive rollers 74,76 and the payout reel 10 passes over a pin 84 on a tension arm 86. The tension arm 86 is supported on a tension arm block 88 through which the shaft 22 freely passes. The shaft 22 freely rotates within the tension arm block 88 and the tension arm block 88 is supported on the shaft 22. This is achieved by providing a freely rotating bearing in the tension arm block 88 for engaging the shaft 22. A helical spring inertia brake 90 is coaxially wound upon the shaft 22. A first end 92 of the helical spring inertia brake 90 is fixed within the transport apparatus to a post 94. The second end 96 of the helical spring inertia brake 90 is free and terminates in a radially-extensive manner away from the shaft 22. The helical spring inertia brake 90 is wound such that, when the payout reel 10 rotates in the first direction as indicated by the thirteenth arrow 82, the motion of the shaft 22 tends to wind the helical spring inertia brake 90 tighter onto the shaft 22. The helical spring inertia brake 90 has a relaxed diameter less than the diameter of the shaft 22 so that the helical spring inertia brake 90 grips the shaft 22. If the shaft 22 is then rotated as indicated by the thirteenth arrow 82, the helical spring inertia brake 90 grips all the harder on the shaft 22 and prevents any further rotation of the payout reel 10.

The tension arm 86 comprises a projection 98 in the proximity of the second end 96 of the helical spring inertia brake 90. As the ribbon 12 commences being drawn from the payout reel 10, the payout reel 10 is prevented from being moved by the helical spring inertia brake 90. Instead of rotating the payout reel 10, the ribbon 12 commences to pull the pin 84 on the tension arm 86 in a direction indicated by a fourteenth arrow 100. When this occurs, the projection 98 on the tension arm 86 engages the free second end 96 of the helical spring inertia brake 90 and commences to unwind the helical spring inertia brake 90 from the shaft 22 thereby loosening the grip of the helical spring inertia brake 90 on the shaft 22. The movement of the tension arm 86 is opposed by the elastic resilience of the helical spring inertia brake 90 as applied to the projection 98 via the free second end 96 of the helical spring inertia brake 90. The tension in the tape between the first and second drive rollers 74,76 and the payout reel 10 therefore steadily increases as the tension arm 86 is drawn in the direction of the fourteenth arrow 100. Shock increases in tension in the ribbon 12 are thereby prevented.

As the helical spring inertia brake 90 is unwound, its grip on the shaft 22 reaches a point where the shaft 22 is free to rotate within the helical spring inertia brake 90. At this point, the payout reel 10 commences to rotate. Any increase in the tension in the ribbon 12 causes further movement of the tension arm 86 inducing further releasing of the helical spring inertia brake 90 thereby compensating for the additional tension required to accelerate the payout reel 10.

The helical spring inertia brake 90 is not completely released by the action of the tension arm 86 and of the projection 98. The projection 98 only releases the helical spring inertia brake 90 sufficiently to allow the shaft 22 to rotate therein. The helical spring inertia brake 90 continues to apply friction to the shaft 22 whilst the ribbon 12 is moving. The friction applied to the shaft 22 by the helical spring inertia brake 90 helps to maintain tension in the ribbon 12. The spring constant of the helical spring inertia brake 90 and the coefficient of friction against the shaft 22 can be chosen such that a predetermined rotation-opposing torque can be applied by the helical spring inertia brake 90 during steady movement of the ribbon 12 from the payout reel 10.

When the first and second drive rollers 74,76 cease to draw the ribbon 12 from the payout reel 10, the ribbon 12 permits the pin 84 to allow the return of the tension arm 86 as indicated by a fifteenth arrow 102 in the direction opposite to that of the fourteenth arrow 100. The projection 98 moves back to allow the helical spring inertia brake 90 to wind back onto the shaft 22 by releasing the second end 96 of the helical spring inertia brake 90. The helical spring inertia brake 90 grips the shaft 22 and rapidly decelerates the payout reel 10 to a halt, thereby limiting the amount of slack ribbon which the payout reel 10 provides. The second end 96 of the helical spring inertia brake 90 continues to push upon the projection 98 to urge the tension arm 86 in the direction of the fifteenth arrow 102 for the pin 84 to take up any slack ribbon 12 whilst the payout reel 10 is halted.

A return spring 104 with a first end affixed to the tension arm 86 and a second end fixed within the transport mechanism, urges the tension arm 86 in the direction of the fifteenth arrow 102. If, for any reason, the ribbon 12 breaks, or the payout reel 10 runs out of ribbon, or indeed if, for reason of any malfunction, there is too much loose ribbon 12 paid out, the return spring 104 urges the tension arm 86 to an extremity of movement in the direction of the fifteenth arrow 102. In this extremity of movement, a tension arm flag portion 106 breaks the optical beam in a photosensor 360 similar to that shown in FIG. 6. The photosensor 360 provides indication of the travel of the tension arm 86 to its extremity of movement by a signal on an output line 380, which signal can be employed by the transport apparatus for sensing the condition of the ribbon 12.

The return spring 104 can be made of sufficient resilience to assist in the tensioning of the ribbon 12 by means of the pin 84 pulling on the intermediate portion. The spring constant of the return spring can be selected to assist in controlling the rotation-opposing frictional torque applied by the helical spring inertia brake 90 to the shaft 22 whilst the ribbon is moving by controlling in part the extent of movement of the tension arm 86 in response to tension in the ribbon 12.

Whilst in normal operation of the elements shown in FIG. 7 there is no requirement for the projection 98 to disengage the free second end 96 of the helical spring inertia brake 90, the elastic constant of the return spring 104 can be chosen such that the return spring 104 pulls round the tension arm 86 to disengage the projection 98 from the free second end 96, thereby providing for a two-force constant increase in ribbon tension as the ribbon begins to move by the ribbon first of all taking up the opposing resilience of the return spring 104, and thereafter taking up the opposing resilience of the combination of the second free end 96 of the helical spring inertia brake 90 and of the return spring 104.

It is to be appreciated that the apparatus shown in FIG. 7 can separately be applied to the shaft 22 without the requirement for applying to the shaft 22 any of the items shown in FIGS. 1 to 5. It is further to be appreciated that the photosensor 360 can be replaced by any other kind of sensor in particular by a switch.

Those skilled in the art will be aware of various minor modifications to be made to the present invention whereby it may be used in magnetic tape transports both for cassette magnetic tape and for open-reel magnetic tape. The apparatus hereinbefore described is separately employable as a tape-breaking sensor in a tape recorder.

I claim:

1. A ribbon transport apparatus for drawing off a ribbon from a payout reel, said apparatus comprising: a driving apparatus for drawing the ribbon from said payout reel; a shaft for supporting said payout reel, said shaft being freely rotatable in a first direction by the ribbon being drawn from said payout reel; a progressively releasable rotation-opposing brake on said shaft; and a tension sensing arm for engaging a portion of the ribbon between said driving apparatus and said payout reel and movable in response to increasing tension therein, coupled to progressively release said brake with said increasing tension in said portion, where, upon commencement of operation of said driving apparatus said arm progressively releases said brake until said brake allows the rotation of said shaft with a predetermined opposing torque for maintaining tension in said portion, and where, upon cessation of operation of said driving apparatus, said arm applies said brake to halt any overrun by said paying out reel.

2. A ribbon transport apparatus according to claim 1, wherein said rotation-opposing brake comprises a helical spring brake, coaxial on said shaft, with relaxed diameter less than the diameter of said shaft to grip said shaft, having a fixed first end, having a free second end and wound such that said rotation of said shaft in said first direction tends to tighten said helical spring brake onto said shaft, where, said arm comprises a projection for engaging said free second end of said helical spring brake to move said free second end of said helical spring brake to loosen said helical spring brake on said shaft with increasing tension in said portion.

3. A ribbon transport apparatus according to claim 2 for use where the ribbon is an ink ribbon for use in impact printing.

4. A ribbon transport apparatus according to claim 2, wherein, prior to said arm releasing said brake by the loosening of said helical spring brake on said shaft, said arm is operable to apply progressively increasing tension to said portion by resilient movement opposed by said free second end of said helical spring brake.

5. A ribbon transport apparatus according to claim 4 for use where the ribbon is an ink ribbon for use in impact printing.

6. A ribbon transport apparatus according to claim 4, wherein, upon said cessation of operation of said driving apparatus said arm is operable to maintain tension in said portion by resilient force applied through said second free end of said helical spring brake.

7. A ribbon transport apparatus according to claim 1, wherein said arm is mounted on said shaft, said shaft being freely rotatable relative to said arm, and wherein said arm is rotatable in a second direction opposite to said first direction by said increasing tension in said portion.

8. A ribbon transport apparatus according to claim 7, wherein said arm comprises a return spring for moving said arm into a predetermined position in the absence of ribbon being between said driving mechanism and said payout reel, and wherein said apparatus comprises a sensor, operable to sense when said arm is in said predetermined position to provide an output signal indicative of there being no ribbon remaining on said payout reel.

9. A ribbon transport apparatus according to claim 8, wherein said return spring urges said arm to rotate in a second direction opposite to said first direction, said arm comprising a flag for operating said sensor in the event of said arm reaching an extremity of movement in said second direction.

10. A ribbon transport apparatus according to claim 8 or claim 9, wherein said sensor is optical.

11. A ribbon transport apparatus according to claim 10, wherein said driving apparatus comprises a pinch wheel assembly for grasping ribbon between a driven wheel and an idler wheel and for moving the ribbon in sympathy with the rotation of said driven wheel.

12. A ribbon transport apparatus according to claim 1, wherein said driving apparatus comprises a pinch wheel assembly for grasping ribbon between a driven wheel and an idler wheel and for moving the ribbon in sympathy with the rotation of said driven wheel.

13. A ribbon transport apparatus according to claim 1, wherein said arm comprises a return spring for moving said arm into a predetermined position in the absence of ribbon being intermediate between said driving mechanism and said payout reel, and wherein said apparatus comprises a sensor, operable to sense when said arm is in said predetermined position to provide an output signal indicative of there being no ribbon remaining on said payout reel.

14. A ribbon transport apparatus according to claim 13, wherein said return spring urges said arm to rotate in a second direction opposite to said first direction, said arm comprising a flag for operating said sensor in the event of said arm reaching an extremity of movement in said second direction.

15. A ribbon transport apparatus according to claim 13 or claim 14, wherein said sensor is optical.

16. A ribbon transport apparatus for transporting a ribbon from a payout reel to a takeup reel, said apparatus comprising: a motor for rotating said takeup reel for drawing off the ribbon onto said takeup reel; a shaft for supporting said payout reel, said shaft being passively rotatable in a first direction by the movement of the ribbon from said payout reel onto said takeup reel; a friction brake on said shaft for opposing the rotation of said shaft with a predetermined amount of opposing torque; and an elastic energy store coupled to said friction brake for opposing the rotation of said friction brake with said shaft, where, the drawing of the ribbon onto said takeup reel is operative to cause said elastic energy store to store the energy imparted thereby to said shaft until said friction brake begins to slide on said shaft, where, thereafter said shaft is rotatable opposed by said predetermined opposing torque for maintaining tension in the ribbon between said payout reel and said takeup reel, and where, thereafter, upon cessation of said drawing of the ribbon onto said takeup reel, said elastic energy store is operable to deliver up a portion of said energy coupled to said friction brake to rotate said shaft in a second direction opposite to said first direction to take onto said payout reel any slack ribbon between said payout reel and said takeup reel and to maintain tension therein.

17. A ribbon transport apparatus according to claim 16, comprising a flag, coupled to rotate with said friction brake and operable to activate a sensor in the event of said friction brake being rotated in said second direction to a predetermined position by said energy store delivering up the whole of said energy indicatively of there being no ribbon remaining on said payout reel.

18. A ribbon transport apparatus according to claim 17, wherein said flag is coupled to a second end of said helical spring brake.

19. A ribbon transport apparatus according to claim 17, wherein said sensor is optical.

20. A ribbon transport apparatus according to claim 16, wherein said energy store comprises a helical storage spring coaxial with said shaft, having a relaxed diameter greater than that of said shaft, wound such that when said shaft rotates in said first direction it tends to unwind said energy storage spring, a first end of said energy store spring being fixed, and a second end of said energy storage spring being coupled to said friction brake.

21. A ribbon transport apparatus according to claim 20, comprising a flag, coupled to rotate with said friction brake and operable to activate a sensor in the event of said friction brake being rotated in said second direction to a predetermined position by said energy store delivering up the whole of said energy indicatively of there being no ribbon remaining on said payout reel.

22. A ribbon transport apparatus according to claim 21, wherein said flag is coupled to a second end of said helical spring brake.

23. A ribbon transport apparatus according to claim 21, wherein said sensor is optical.

24. A ribbon transport apparatus according to claim 20, wherein said friction brake comprises a helical spring brake coaxial with said shaft and having a relaxed diameter less than that of said shaft for said helical spring brake to grip said shaft and apply thereto said predetermined amount of opposing torque, said second end of said energy storage spring engaging a first end of said helical spring brake, said helical spring brake being wound such that, as said shaft rotates in said first direction, said second end of said energy storage spring urges said helical spring brake towards being unwound.

25. A ribbon transport apparatus according to claim 24, wherein said energy storage spring and said spring brake are continuous one with the other, being wound from the same piece of resilient material.

26. A ribbon transport apparatus according to claim 24, comprising a flag, coupled to rotate with said friction brake and operable to activate a sensor in the event of said friction brake being rotated in said second direction to a predetermined position by said energy store delivering up the whole of said energy indicatively of there being no ribbon remaining on said payout reel.

27. A ribbon transport apparatus according to claim 26, wherein said flag is coupled to a second end of said helical spring brake.

28. A ribbon transport apparatus according to claim 26 wherein said sensor is optical.

29. A ribbon transport apparatus according to claim 1 for use where the ribbon is an ink ribbon for use in impact printing.

* * * * *